US012771755B2

(12) United States Patent
Mengel et al.

(10) Patent No.: US 12,771,755 B2
(45) Date of Patent: Oct. 20, 2026

(54) VISUAL MAP OF A DISCOVERED SERVICE BASED ON COMPUTER PROCESSES

(71) Applicant: ServiceNow, Inc., Santa Clara, CA (US)

(72) Inventors: Barel Mengel, Petah Tikva (IL); Hail Tal, Kokhav Ya'ir (IL); Aakash Umeshbhai Bhagat, Bangalore (IN); Arik Sityon, Ganney Tikva (IL); Robert Bitterfeld, Petah Tikva (IL); Noy Shpatz, Givatayim (IL); Darshan Ghanalinga Murthy, Bangalore (IN); Atul Gupta, Bangalore (IN); Priyanka Goel, New Delhi (IN); Dov Harel, Nir Galim (IL); Tal Epshtein, Hod Hasharon (IL); Sreenevas Subramaniam, Dublin, CA (US); Shruti Jain, Jalgaon (IN)

(73) Assignee: ServiceNow, Inc., Santa Clara, CA (US)

( * ) Notice: Subject to any disclaimer, the term of this patent is extended or adjusted under 35 U.S.C. 154(b) by 49 days.

(21) Appl. No.: 18/947,645

(22) Filed: Nov. 14, 2024

(65) Prior Publication Data

US 2025/0071184 A1 Feb. 27, 2025

Related U.S. Application Data

(63) Continuation of application No. 18/112,860, filed on Feb. 22, 2023, now Pat. No. 12,184,742.

(51) Int. Cl.
*H04L 67/51* (2022.01)

(52) U.S. Cl.
CPC .................................... *H04L 67/51* (2022.05)

(58) Field of Classification Search
CPC ........................................................ H04L 67/51
USPC .......................................................... 709/203
See application file for complete search history.

(56) References Cited

U.S. PATENT DOCUMENTS

| | | | | |
|---|---|---|---|---|
| 9,467,475 | B2 * | 10/2016 | Faltyn | H04W 12/08 |
| 10,911,314 | B2 * | 2/2021 | Rimar | H04L 41/145 |
| 10,979,296 | B2 * | 4/2021 | Makovsky | H04L 41/0853 |
| 11,057,276 | B2 * | 7/2021 | Biran | H04L 43/065 |
| 11,070,435 | B2 * | 7/2021 | Ben Ari | G06F 16/245 |
| 11,394,770 | B1 | 7/2022 | Bello | |
| 12,184,742 | B1 * | 12/2024 | Mengel | H04L 67/51 |
| 2013/0108259 | A1 | 5/2013 | Srinivas | |
| 2017/0070457 | A1 * | 3/2017 | Sachs | H04L 67/104 |
| 2018/0167467 | A1 * | 6/2018 | Chen | H04L 41/22 |
| 2018/0219894 | A1 | 8/2018 | Crabtree | |
| 2019/0052531 | A1 * | 2/2019 | Sividia | H04L 41/0895 |
| 2019/0158524 | A1 | 5/2019 | Zadeh | |
| 2020/0076832 | A1 * | 3/2020 | Jusko | H04L 63/1416 |

(Continued)

*Primary Examiner* — David P Zarka
(74) *Attorney, Agent, or Firm* — McDonnell Boehnen Hulbert & Berghoff LLP

(57) ABSTRACT

Data communication between a plurality of computer processes are tracked. The data communication between the plurality of computer processes are analyzed to classify relationships between the plurality of computer processes. Based at least in part on the classified relationships between the plurality of computer processes, an existence of a service provided by a functional group of computer processes included in the plurality of computer processes are automatically discovered. A visual map of the discovered service is generated.

20 Claims, 9 Drawing Sheets

800

(56) References Cited

U.S. PATENT DOCUMENTS

| | | | | |
|---|---|---|---|---|
| 2021/0142100 | A1* | 5/2021 | Chen | G06F 18/2178 |
| 2022/0376986 | A1 | 11/2022 | Sheppard | |
| 2024/0195908 | A1* | 6/2024 | Bansal | H04M 3/2209 |
| 2025/0023892 | A1* | 1/2025 | Herzog | H04L 63/1425 |

* cited by examiner

700

VISUAL MAP OF A DISCOVERED SERVICE BASED ON COMPUTER PROCESSES

CROSS REFERENCE TO OTHER APPLICATIONS

This application is a continuation of U.S. patent application Ser. No. 18/112,860 entitled AUTOMATIC SERVICE DISCOVERY Feb. 22, 2023 which is incorporated herein by reference for all purposes.

BACKGROUND OF THE INVENTION

A networked information technology environment, such as one for a corporation, can host a large number of services. Many of these services involve interactions between a large group of different computer resources associated with one or more computer systems within the network. For example, an employee of a corporation can launch a service such as a video conferencing service that utilizes computing resources including processor, memory, and storage resources associated with multiple computing systems located within the corporate network infrastructure.

BRIEF DESCRIPTION OF THE DRA WINGS

Various embodiments of the invention are disclosed in the following detailed description and the accompanying drawings.

DETAILED DESCRIPTION

Figure 1:
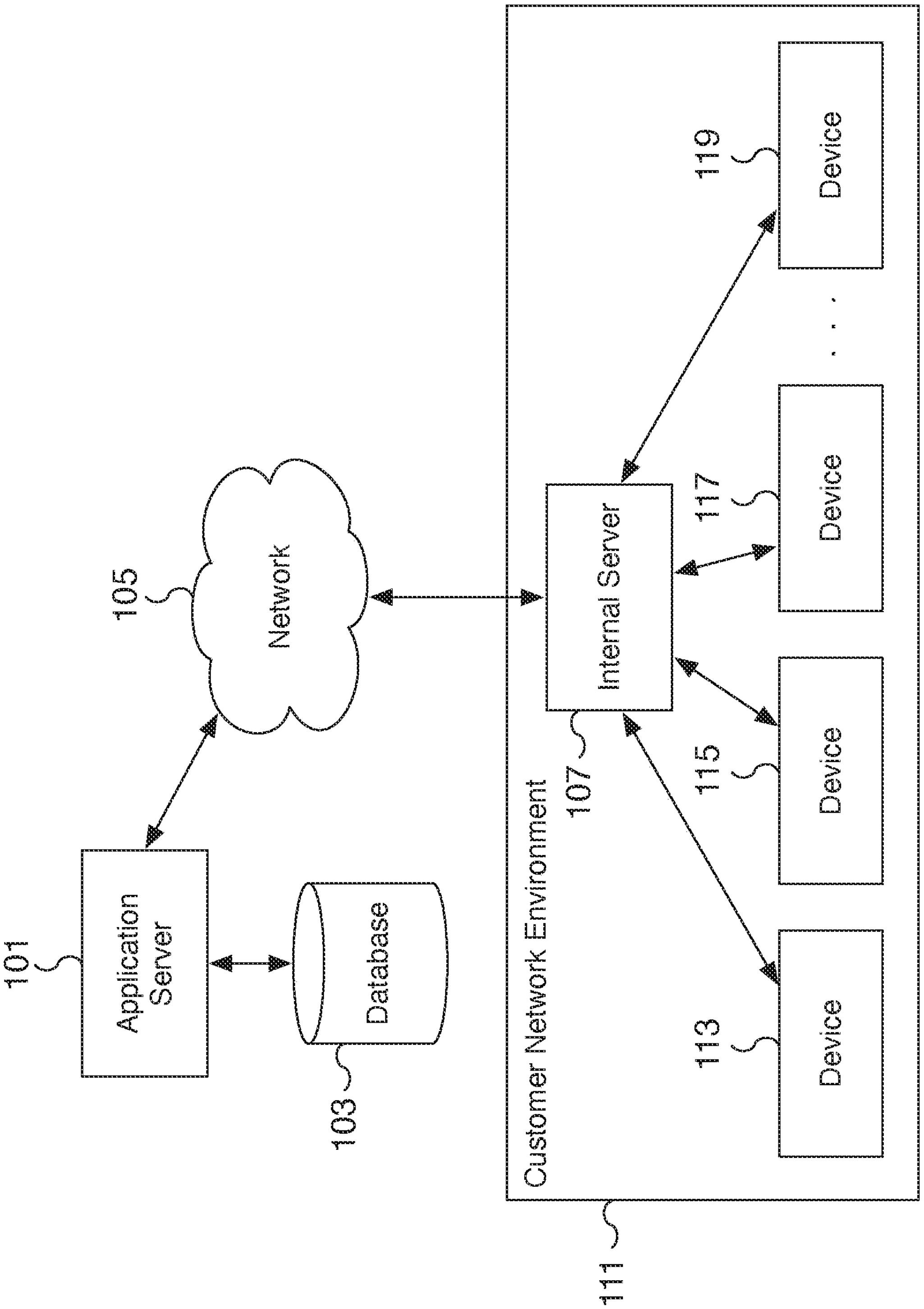
FIG. 1 is a block diagram illustrating an example of a network environment for performing the automatic discovery of services.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The automatic discovery of services running within a networked information technology environment is disclosed. For example, using an automatic discovery service, such as one provided by an information technology operations management (ITOM) cloud service, services running within a networked information technology environment can be automatically discovered. Once discovered, these services can be visually mapped and presented to information technology (IT) administrators. By identifying and visualizing the services running with the network environment, IT administrators can more easily manage and track the use of IT resources and more quickly resolve related issues, significantly improving the operational performance of the IT environment. For example, once a service is identified, an IT administrator can track the efficiency and performance of the service including the network, memory, and processor utilization expended by the service. Furthermore, the ability to monitor a discovered service allows the IT administrators to identify and/or predict when services are performing poorly and how to address any identified or potential deficiencies. For example, in the event a service that relies on multiple load balancers, multiple applications servers, and a backend database is not performing as expected, determining that the fault is with the backend database allows an IT administrator to conclude that provisioning additional load balancers would not solve the problem.

In various embodiments, the services are automatically discovered by first identifying connections between processes running in the network environment. These discovered process connections are then ranked using a machine learning model that predicts a confidence score for each connection. A high confidence score indicates that the connection is likely related to a service and is a potential connection that makes up a service. Lower scoring connections are excluded and likely related to non-service use cases. By further evaluating the high scoring connections and their corresponding nodes, one or more services are discovered. For example, the high scoring connections and their corresponding nodes can be evaluated to determine the set of nodes and corresponding connections that make up a discovered service. The service discovery process can further create a visual map for each discovered service including visualizing the direction of connections between service nodes and describing various attributes associated with each node such as a process name or connection type. In various embodiments, the discovered services are presented via a graphical user interface of a cloud-based ITOM service that further allows the IT administrator to manage the discovered services including the ability to create a service template for each discovered service for future monitoring of the service.

In some embodiments, data communication between a plurality of computer processes is tracked. For example, one or more networking modules or agents monitor connections between different processes established within a networked computing environment. The monitored data communications can include monitoring network connections between different processes running on the same or different computer systems or network devices. In some embodiments, relationships between the plurality of computer processes are classified including by analyzing the data communication between the plurality of computer processes using a machine learning model. For example, the relationship between two nodes connected via a discovered connection is evaluated to determine whether the relationship is one that relates to a service. In some embodiments, the evaluation utilizes a machine learning model to predict a confidence score for each discovered network connection, classifying the connection as a connection that is utilized by a service or a connection that is not utilized by a service. In some embodiments, based at least in part on the classified relationships between the plurality of computer processes, an existence of a service provided by a functional group of computer processes included in the plurality of computer processes is automatically discovered. For example, by utilizing only the relationships between computer processes that are classified as belonging to a service, the computer processes meeting the requirements can be identified as service nodes with corresponding service connections. In various embodiments, based on an evaluation of the connectivity of the discovered service nodes and connections, services are automatically discovered including by identifying an entry point for each discovered service. As part of the discovery process, the discovered services can be presented as a functional group of computer processes with service connections between them. In some embodiments, a visual map is automatically created for each discovered service allowing administrators to easily and quickly visualize the components that make up each discovered service.

FIG. 1 is a block diagram illustrating an example of a network environment for performing the automatic discovery of services. In the example shown, application server 101 and customer network environment 111 are connected via network 105. Network 105 can be a public or private network. In some embodiments, network 105 is a public network such as the Internet. In various embodiments, application server 101 is a cloud-based application server that provides application services including an information technology operations management (ITOM) cloud service to automatically discover services running within a customer network such as customer network environment 111. Application server 101 utilizes database 103, which is communicatively connected to application server 101. Application server 101 together with internal server 107, which is located within customer network environment 111, are part of a discovery platform for discovering services running within customer network environment 111. For example, using the automatic service discovery service offered by application server 101, an administrator is presented with the discovered services running within customer network environment 111 that utilize one or more of the devices of customer network environment 111. In the example shown, example devices of customer network environment 111 include devices 113, 115, 117, and 119.

In some embodiments, application server 101 provides cloud-based services for managing information technology operations including the automatic discovery of services within a customer's information technology environment. For example, a service running on the customer's network environment can utilize entities (or devices) within the customer's network infrastructure, such as devices 113, 115, 117, and 119. The connections between processes running on these devices are discovered and used to discover the associated services running within customer network environment 111. Once a service is discovered, the discovered services are provided to the customer via an automatic service discovery service offered by application server 101. The cloud-based discovery service can present the discovered services as visual maps and allow an administrator the ability to create a template defining each discovered service. In some embodiments, a created service template is used for future monitoring of a service and allows the description of the service to dynamically expand or contract as required, for example, as new load balancers, servers, databases, and/or other entities are added or removed from the service. In some embodiments, application server 101 offers additional cloud services such as a configuration management database (CMDB) service for managing devices and/or configuration items for a customer. In various embodiments, application server 101 stores collected discovery service data in database 103.

In some embodiments, application server 101 provides machine learning functionality to analyze and classify discovery information collected from customer environments. For example, application server 101 can classify and/or score discovered connections and/or processes associated with customer network environment 111 as part of a process in building a set of discovered services running on customer network environment 111. In various embodiments, the machine learning functionality including the machine learning inference servers may be implemented as part of application server 101 and/or implemented as separate components utilized by application server 101.

In some embodiments, customer network environment 111 is an information technology network environment and includes multiple hardware devices including devices 113, 115, 117, and 119, as examples. Devices 113, 115, 117, and 119 correspond to hardware devices and each can be one of a variety of different hardware device types including networking equipment (such as gateways and firewalls), load balancers, servers including application servers and database servers among other servers, and other computing devices including employee laptops and desktops. Devices 113, 115, 117, and 119 are each configured with different hardware and software components, and they generally have the ability to accept or initiate connections between processes associated with the devices and in some instances with a network client located outside of customer network environment 111. For example, a process running on device 113 can establish a connection with a process running on device 115. In various embodiments, customer network environment 111 is connected to network 105. In the example shown, internal server 107, either alone or with the help of additional monitoring modules or agents, is capable of monitoring the processes and/or network connections associated with the devices within customer network environment 111, such as the processes running on devices 113, 115, 117, and 119 and their associated network connections. In various embodiments, the topology of customer network environment 111 can differ and the topology shown in FIG. 1 is just one simplified example.

In the example shown, internal server 107 is an intranet server of customer network environment 111 and the bi-directional connections between internal server 107 and devices 113, 115, 117, and 119 represent the ability for internal server 107 to monitor devices 113, 115, 117, and 119. Depending on the network configuration, the components within customer network environment 111 including internal server 107 and devices 113, 115, 117, and 119 may have full or limited bi-directional or one-directional network connectivity to one another. Internal server 107 can be configured to receive and perform service discovery requests from application server 101 including requests to monitor the processes running and/or connections established within customer network environment 111. The results of the monitoring are sent back to application server 101 where they can be analyzed and evaluated to identify discovered services. Although other approaches may be appropriate, in various embodiments, internal server 107 is utilized to perform the monitoring because it resides within customer network environment 111 and has increased access privileges to devices and network data communication that a device outside of customer network environment 111 does not have. For example, internal server 107 can be configured with access permissions allowing it to monitor the data connections between processes running on the devices within customer network environment 111 as well as the ability to monitor what processes are running on the respective devices. In some embodiments, internal server 107 may rely on one or more monitoring agents and/or monitoring components associated with the different devices and/or potential sub-networks (not shown) of customer network environment 111, for example, to properly monitor the data communication and information required for automatic service discovery.

In some embodiments, the functionality of internal server 107 may be implemented by one or more additional devices including by customer devices such as a combination of one or more of devices 113, 115, 117, and/or 119. For example, monitoring agents can be installed on or in parallel to the respective devices to monitor processes and/or network connections associated with different devices. Depending on the network configuration of customer network environment 111, such as the ability to accept certain types of incoming network connections, at least a portion of the functionality performed at internal server 107 can be implemented by application server 101.

In some embodiments, database 103 is utilized by application server 101 for providing application services including services for the automatic discovery of services and CMDB services. For example, database 103 can be used to store discovery data associated with services discovered within a customer network such as customer network environment 111. In some embodiments, database 103 is implemented using one or more databases such as one or more distributed database servers. For example, although shown as a single entity in FIG. 1, database 103 can be implemented as one or more distributed database components connected via network 105 to application server 101. In some embodiments, database 103 further functions as a configuration management database (CMDB) and is used at least in part for managing assets that are under the management of an organization, such as devices 113, 115, 117, and/or 119 of customer network environment 111. For example, each managed asset can be represented as a configuration item within database 103. In some embodiments, database 103 stores information related to managed assets, such as the hardware and/or software configuration of a computing device, as configuration items.

Although single instances of some components have been shown to simplify the diagram of FIG. 1, additional instances of any of the components shown in FIG. 1 may exist. For example, application server 101 and database 103 may include one or more servers and/or may share servers. In some embodiments, database 103 may not be directly connected to application server 101. For example, database 103 and its components may be replicated and/or distributed across multiple servers and/or components. In some embodiments, components not shown in FIG. 1 may also exist. For example, network clients used to access application server 101 are not shown.

Figure 2:
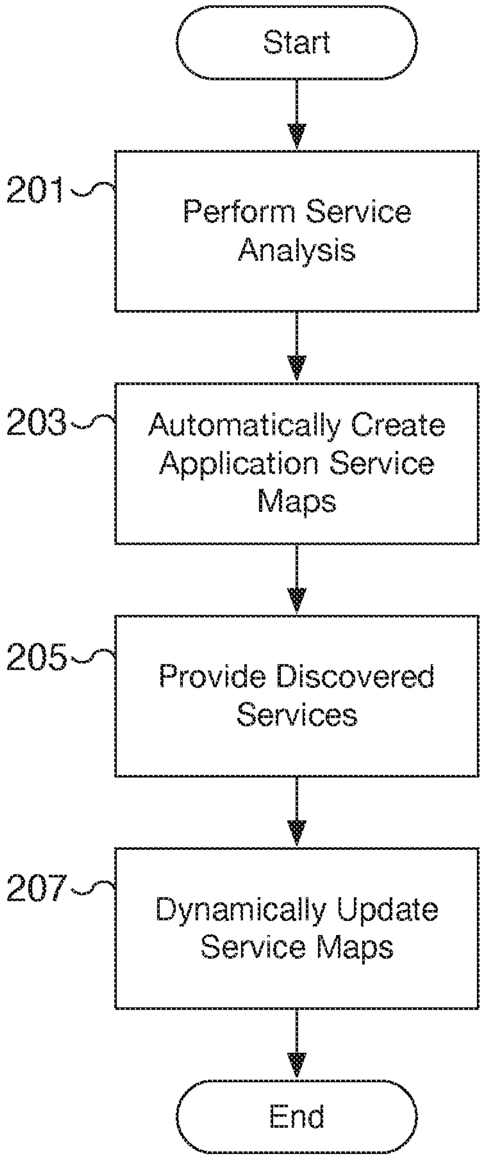
FIG. 2 is a flow chart illustrating an embodiment of a process for performing the automatic discovery of services.

FIG. 2 is a flow chart illustrating an embodiment of a process for performing the automatic discovery of services. Using the process of FIG. 2, a network computing environment can be analyzed to automatically detect services that are running. In various embodiments, the network environment is monitored and using the monitored results, an application service provides the discovered services, for example, to information technology (IT) administrators via a graphical user interface of a cloud-based ITOM service. For each discovered service, a visual map of the discovered service is created allowing the IT administrators to visualize the different component nodes of the service and their corresponding relationships. In various embodiments, based on the discovered services, a service template can be further created for each discovered service allowing for future managing and monitoring of the service. In some embodiments, the process of FIG. 2 is performed by an automatic service discovery service running on an application server such as application server 101 of FIG. 1 and the information technology network computing environment analyzed is customer network environment 111 of FIG. 1. In some embodiments, an internal server such as internal server 107 of FIG. 1 is utilized to monitor data communication as part of the process of automatically discovering services. In some embodiments, the service discovery results are stored in a database such as database 103 of FIG. 1.

At 201, service analysis is performed. For example, the network computing environment is evaluated to identify potential services. In some embodiments, the data communications are monitored including monitoring what connections are established between different processes within the network environment. The connections and their end nodes are analyzed to identify potential services. For example, the connections and their associated nodes are analyzed to identify a connected graph of nodes with an entry point. Different identified services will correspond to different connected graphs of service nodes. In various embodiments, the connections and/or processes can be initially ranked and/or scored to determine which connections and processes should be considered as service connections and nodes.

At 203, application service maps are automatically created. For example, for each service identified at 201, a visual map of the service is automatically created. In some embodiments, the visual map includes service nodes corresponding to different processes and service connections between the nodes corresponding to network connections. In some embodiments, details of the nodes and connections are also provided including the process names and connection types. Once created, the visual service map allows an IT administrator to visualize the different components that make up a service. When monitoring the service, the visual map allows an administrator to easily identify and isolate potential problems. In various embodiments, the visual map includes an identified entry point to the service.

At 205, discovered services are provided. For example, the services identified at 201 are provided as the results of the automatic discovery of services for the associated network environment. In various embodiments, using the analysis performed at 201, each identified service is presented via a cloud service as a discovered service. Moreover, each discovered service is presented along with a visual map of the service showing its different service nodes and connections. In some embodiments, the discovered services are provided via a graphical user interface accessible via the cloud service. For example, an IT administrator accessing the ITOM cloud service is provided with a visual map of each discovered service. In some embodiments, each discovered service can be further modified, for example, by an IT administrator, to add or remove service nodes, as appropriate.

At 207, the service maps are dynamically updated. For example, each discovered service can be described using a rule-based template. For each applicable discovered service, once the service template is applied, the service can be monitored for changes including the addition and removal of service nodes and connections. In various embodiments, the visual service maps are dynamically updated by applying the rule-based template to the most current state of the network environment to determine a current representation of the service. For example, in the event a new load balancer is added to the service after the creation of the rule-based service template, the service template will capture the newly added load balancer and the visual map of the service is dynamically updated to include the additional load balancer and associated connections.

Figure 3:
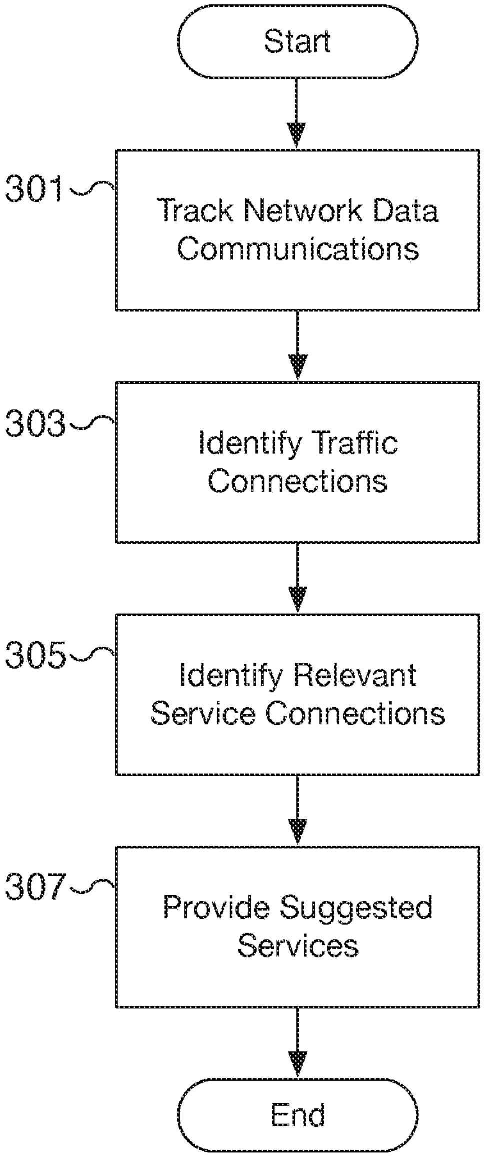
FIG. 3 is a flow chart illustrating an embodiment of a process for performing the automatic discovery of services.

FIG. 3 is a flow chart illustrating an embodiment of a process for performing the automatic discovery of services. Using the process of FIG. 3, a network computing environment is monitored and the results are analyzed to automatically detect services that are running within the environment. In some embodiments, the analysis includes evaluating monitored network traffic between different processes to identify connections relevant to services. In some embodiments, the process of FIG. 3 is performed by an automatic service discovery service running on an application server such as application server 101 of FIG. 1 and the information technology network computing environment analyzed is customer network environment 111 of FIG. 1. In some embodiments, an internal server such as internal server 107 of FIG. 1 is utilized to monitor data communication as part of the process of automatically discovering services. In some embodiments, the process of FIG. 3 is performed at 201, 203, and/or 205 of FIG. 2.

At 301, network data communication is tracked. For example, data communications between different processes running on the network are monitored and tracked. In various embodiments, the network traffic can include both service communications as well as non-service communications. For example, a network communication between two service nodes related to a server application accessing a database for a metrics and alert monitoring service will likely be considered as data communication related to a service. In contrast, an outgoing email is unlikely to be considered as data communication related to a service. In various embodiments, the service nodes, relevant processes, and other related properties of the data communication are also tracked.

In some embodiments, the network data communication is tracked at least in part by an internal server located within the network computing environment. The internal server along with potential additional monitoring agents and/or modules are granted permission to monitor the traffic between and on devices within the network computing environment. In some embodiments, the monitoring functionality is further granted the permission and includes the ability to monitor the processes running on the different computing devices within the network computing environment. In particular embodiments, the functionality is performed by modules and/or agents running on the devices and not necessarily by a separate internal server. Once the required network data communication has been tracked the results can be provided to the application server for additional processing.

At 303, traffic connections are identified. For example, using the results from the network data communication tracked at 301, traffic connections are identified. In some embodiments, a fingerprint process is applied to categorize each connection. For example, a network connection can be assigned an application fingerprint based on the tracked properties, such as the type of network connection and the type of process at each end point of the connection, among other properties. As an example, one tracked network connection may be identified as an outgoing email. As another example, another tracked network connection may be identified as an application database update for a metrics and alert monitoring service.

At 305, relevant service connections are identified. For example, using the traffic connections identified at 303, each network connection is scored and/or ranked to determine whether the network connection is related to a service. In some embodiments, the scoring produces a confidence score that indicates the likelihood the connection is relevant to a service. For example, an outgoing email connection can be scored as unlikely to be related to a service. In particular network deployments, even in the event an email service exists for the computing environment, given the number of outgoing emails, each outgoing email connection is unlikely to be considered an essential connection to the running of the email service. As another example, a network connection identified as a database update for a metrics and alert monitoring service can be identified as a relevant service connection and would receive a high confidence score.

At 307, suggested services are provided. For example, using the relevant service connections identified at 305, each connection is analyzed to determine the service to which it belongs. In various embodiments, service connections that form a connected graph correspond to a particular discovered service. In some embodiments, a visual map is created for each discovered service using the corresponding determined connected graph. In various embodiments, the suggested services are the services discovered for the relevant network. The suggested services can be provided, for example, as part of a cloud service to an administrator responsible for managing the services associated with the network.

Figure 4:
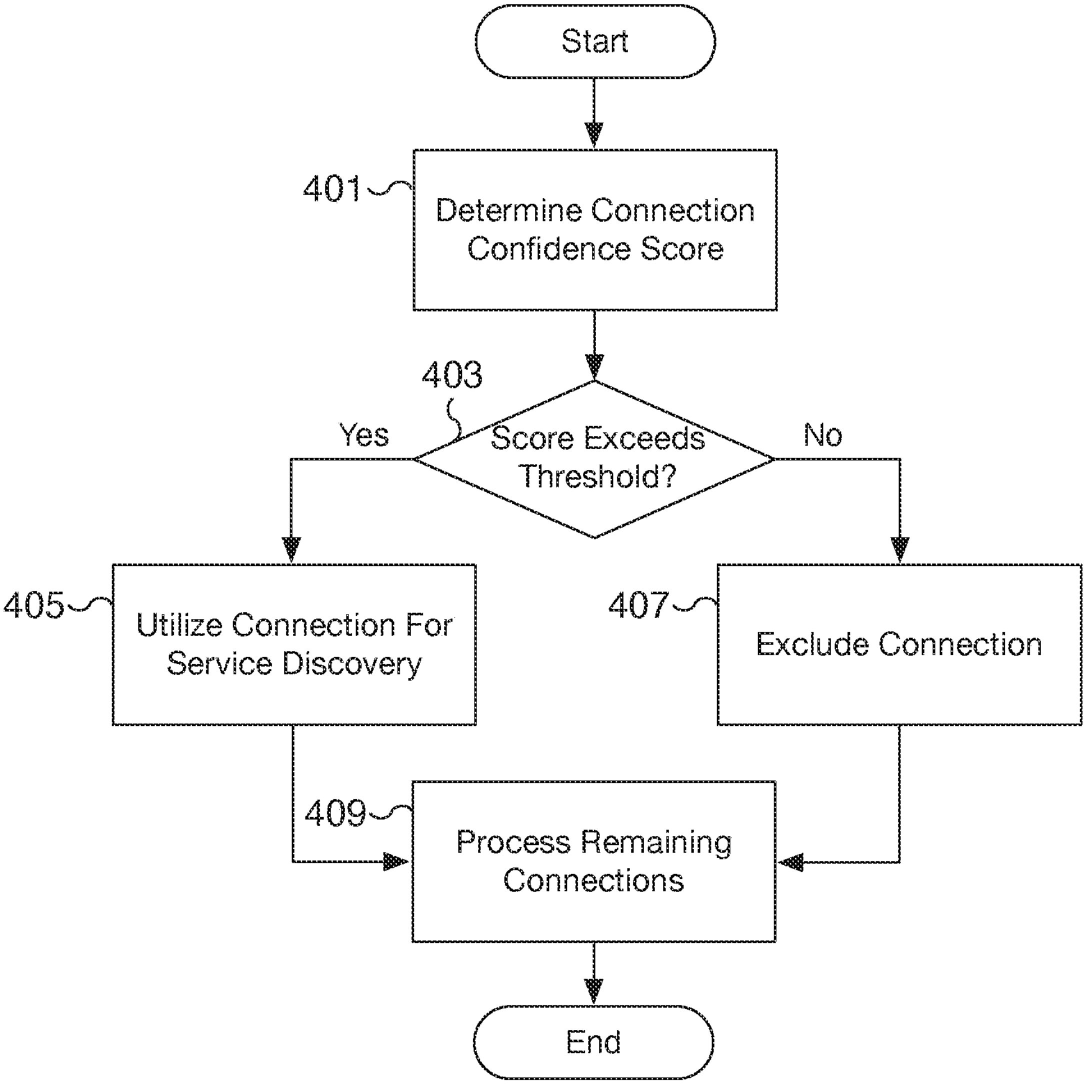
FIG. 4 is a flow chart illustrating an embodiment of a process for identifying relevant service connections.

FIG. 4 is a flow chart illustrating an embodiment of a process for identifying relevant service connections. Using the process of FIG. 4, connections discovered for a network computing environment are evaluated to identify the specific connections that are relevant for services running on the associated network environment. In various embodiments, the connections are first discovered by monitoring the data communication within the network and then identifying traffic connections by their unique properties. In some embodiments, the process of FIG. 4 is performed by an automatic service discovery service running on an application server such as application server 101 of FIG. 1 and the information technology network computing environment analyzed is customer network environment 111 of FIG. 1. For example, application server 101 can include and/or utilize one or more machine learning inference servers for predicting the confidence score for a connection. In some embodiments, the process of FIG. 4 is performed at 201, 203, and/or 205 of FIG. 2 and/or at 303 and/or 305 of FIG. 3.

At 401, a connection confidence score is determined. For example, a machine learning model is applied to predict a confidence score for a particular network connection. The predicted score corresponds to the likelihood the connection is relevant to a service. For example, a high confidence score indicates the connection is likely relevant to a service whereas a low confidence score indicates the connection is likely not relevant to a service. In various embodiments, the machine learning model utilizes the connection properties including connection type and properties of the processes associated with the connection as input features for predicting the confidence score. For example, connection properties can include the direction of the connection, the protocol associated with the connection, and the address and/or port of the connection, among other connection properties. Example process properties can include the access privileges associated with the process, the user account executing the process, whether the process is a client or a server, the name of the process, and the process priority of the process, among other process properties.

At 403, a determination is made whether the confidence score exceeds a threshold value. In the event the confidence score exceeds a threshold value, processing proceeds to 405. In the event the confidence score does not exceed a threshold value, processing proceeds to 407. In various embodiments, the threshold value is a configured threshold value that corresponds to a confidence score that should be considered relevant to a service used to evaluate the predicted connection confidence score.

At 405, the connection is utilized for service discovery. For example, based on the predicted confidence score, the connection is likely to be relevant for a discovered service and should be considered when determining the services running on the network. In various embodiments, the connection is identified as relevant and used to determine a connection graph of connections and connection nodes for identifying running services. In some embodiments, the determination of the actual service and its connections is determined after all the connections have been processed for utilization as part of the service discovery process or excluded from the service discovery process.

At 407, the connection is excluded. For example, based on the predicted confidence score, the connection is unlikely to be relevant for a discovered service. The excluded connection does not need to be considered for building a service map for any of the discovered services.

At 409, the remaining connections are processed. For example, the remaining connections that have been identified are processed by repeating the process of FIG. 4 with the next available connection for processing. In some embodiments, multiple connections can be processed in parallel. Once the connections are processed, a subsequent processing step determines the discovered services by utilizing the connections identified as service connections at 405.

Figure 5:
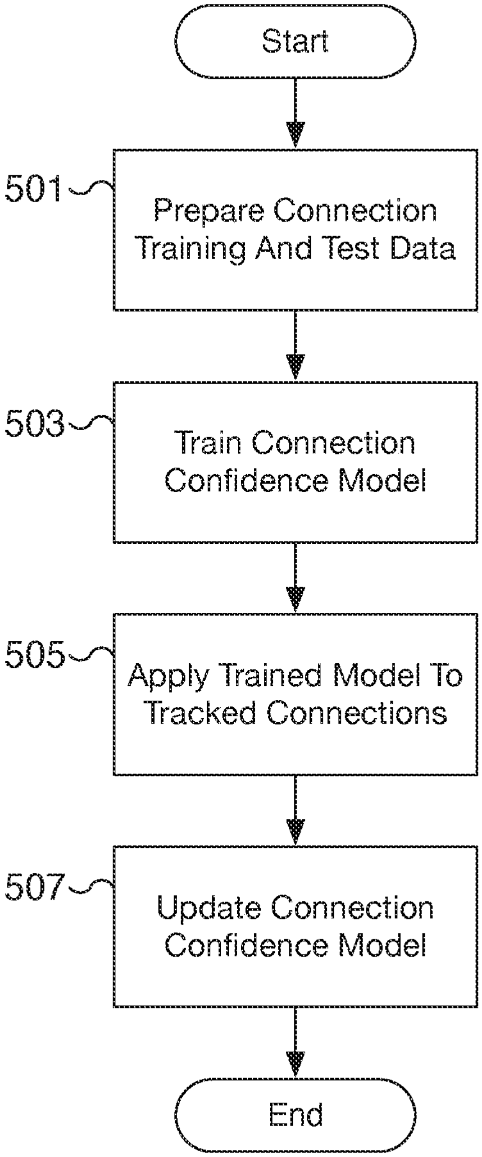
FIG. 5 is a flow chart illustrating an embodiment of a process for determining connection confidence scores.

FIG. 5 is a flow chart illustrating an embodiment of a process for determining connection confidence scores. Using the process of FIG. 5, connections discovered for a network computing environment can be scored using a trained machine learning model. For example, a deep learning model can be applied to input features of a connection to predict a confidence score that describes how likely the connection is relevant to a service. In some embodiments, the process of FIG. 5 is performed by an automatic service discovery service running on an application server such as application server 101 of FIG. 1 and using connections discovered from an information technology network environment such as customer network environment 111 of FIG. 1. For example, application server 101 can include and/or utilize one or more machine learning training and inference servers for predicting the confidence score for a connection. In some embodiments, a database or data store such as database 103 of FIG. 1 is utilized during the process of FIG. 5, for example, to store data including training data, model data, connection data, and/or predicted confidence scores. In some embodiments, the process of FIG. 5 is performed at 201, 203, and/or 205 of FIG. 2, at 303 and/or 305 of FIG. 3, and/or 401 and/or 403 of FIG. 4.

At 501, connection training and test data are prepared. For example, data such as historical data is gathered and prepared including by preprocessing to generate machine learning training and test data for training a machine learning model. In some embodiments, the data is based on actual network data communications data collected from the customer and can involve confidence scores provided by users familiar with the network data. In some embodiments, the prepared training and test data is based on data from related and/or similar workflows. In various embodiments, the data can include properties related to network connections and their associated processes. For example, connection properties can include the direction of the connection, the protocol associated with the connection, and the address and/or port of the connection, among other connection properties, and example process properties can include the access privileges associated with the process, the user account executing the process, whether the process is a client or a server, the name of the process, and the process priority of the process, among other process properties.

At 503, a connection confidence model is trained. Using the training and test data prepared at 501, a connection confidence model is trained. In some embodiments, the prepared data is used to train one or more machine learning models used to predict a confidence score based on connection input features. In particular embodiments, a single model or multiple models may be utilized. In some embodiments, a different machine learning model is trained for each customer or subset of customers of a cloud service.

At 505, the trained connection confidence model is applied to tracked connections. For example, using the trained connection confidence model, confidence scores are predicted for tracked connections. In various embodiments, the model is applied to connection input features such as properties of the connection and its associated processes. In some embodiments, one or more models are utilized, depending on the input data and required scores. For example, different models may be appropriate depending on the type of connection for which a confidence score is required or the network or sub-network environment of interest. In various embodiments, the confidence score predicted for each connection describes how likely the connection is relevant to a service. In some embodiments, a threshold value used to compare predicted confidence scores is configured to determine whether a connection should be considered or should be excluded from consideration when discovering services.

At 507, the connection confidence model is updated. For example, using the more recent data gathered from monitoring network data communications, one or more trained machine learning models for confidence score prediction are updated. In some embodiments, the trained models can be evaluated to determine whether their prediction scores are still accurate and relevant. For example, in the event the predicted scores are no longer accurate, the relevant model can be updated. In some embodiments, the most recent tracked connection data is used to retrain the relevant machine learning models and older data can be expired and removed from the training and test data sets.

Figure 6:
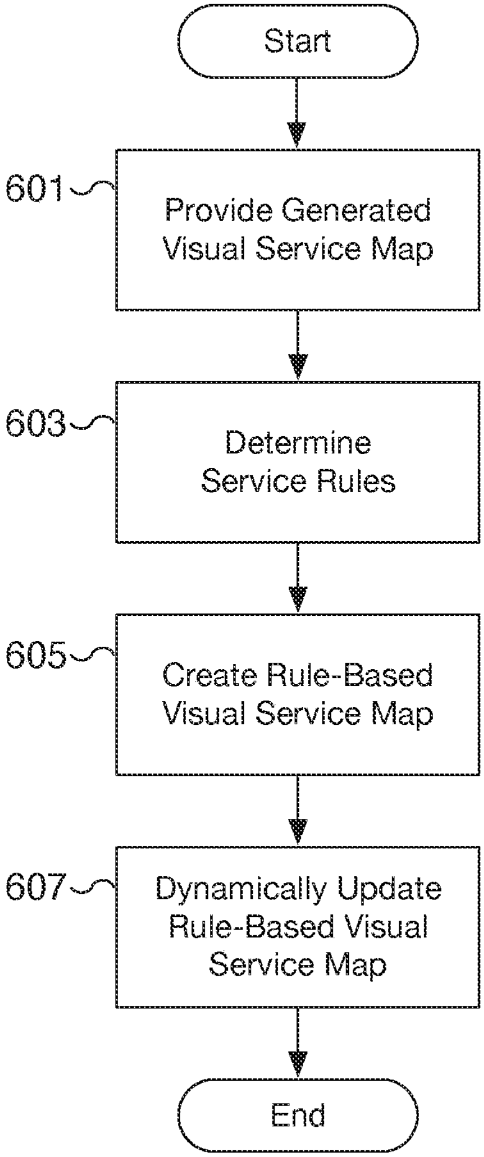
FIG. 6 is a flow chart illustrating an embodiment of a process for dynamically updating a service map of an automatically discovered service.

FIG. 6 is a flow chart illustrating an embodiment of a process for dynamically updating a service map of an automatically discovered service. For example, using the process of FIG. 6, a service automatically discovered for a network computing environment is accessible to administrators via a cloud service. As part of the service discovery process described herein, a visual service map is generated and provided for the discovered service, allowing administrators the ability to visualize the different service nodes and connections of the service. In the event an administrator would like to continue monitoring the discovered service, a service template can be created that allows the service and its visual map to be dynamically updated using a rules-based definition of the service. In some embodiments, the process of FIG. 6 is performed by an automatic service discovery service running on an application server such as application server 101 of FIG. 1 and using connections discovered from an information technology network environment such as customer network environment 111 of FIG. 1. In some embodiments, a database or data store such as database 103 of FIG. 1 is utilized during the process of FIG. 6, for example, to store the descriptions of a discovered service, its visual service map, and its service template. In some embodiments, the process of FIG. 6 is performed at 205 and/or 207 of FIG. 2.

At 601, a generated visual service map is provided. For example, a visual map showing the service nodes and their connections is provided via a graphical user interface. In some embodiments, the service map includes details of the service nodes and connections, such as the process name of each service node and the type of connection for each service connection. Other properties of the service, its nodes, and its connections can be included or provided upon request, for example, via a drill-down menu or a supplemental user interface view. In some embodiments, the visual map and the corresponding service can be modified via an interactive visual map. For example, an administrator can add or remove nodes and connections as appropriate. Similarly, in some embodiments, an administrator can rename or provide additional details for each service node or connection. In various embodiments, the provided visual map includes an identified entry point into the service.

At 603, service rules are determined. For example, using the discovered service, its connections, and its nodes as a starting point, services rules are determined that define the service and stored as a service template. In various embodiments, one or more rules are determined that together define the service and/or each service can include multiple rules to describe the entirety of the service. As an example, a rule can be generated that defines a connection between a database server process and an application service process based on the connection type and process names. As another example, a rule can be generated that defines a connection between a load balancer process and an application service process based on the connection type, the process names, and the address and ports of the two processes. Other properties including connection and process properties can be used to define a rule. In various embodiments, the rules are logic-based rules and can utilize Boolean logic operators. In some embodiments, once the initial rules are determined, an administrator can add, remove, and/or modify the determined rules as appropriate to modify the definition of the service. By modifying the service rules, the service can capture more or fewer service connections and nodes. In various embodiments, the determined rules are stored as a rule-based service template with additional properties of the service such as a service name, service operating parameters, and a resource count for the service, among other properties.

At 605, a rule-based visual service map is created. For example, using the service rules generated at 603, a rule-based version of a visual service map is created. In various embodiments, the rule-based visual map matches the visual service map provided at 601. Unlike the visual map provided at 601, however, the rule-based visual map is generated using rules and can be dynamically updated by applying the service rules to the current state of the network environment. In various embodiments, an administrator can add or remove nodes and connections as appropriate from the rule-based visual map and any changes made will result in updating the service rules such that the rule-based visual service map is always consistent with the service rules.

At 607, the rule-based visual service map is dynamically updated. For example, as the network environment changes and newly added or removed service nodes and connections are discovered, the visual service map is updated to reflect the changes. In various embodiments, the service rules are applied to the discovered network changes to dynamically update the service map including the visual map depicting the service. For example, in the event a new load balancer is discovered that is connected to an application service, the new service nodes and connections are dynamically added to the appropriate service whose rule captures the newly discovered components. In this example, since the service has been scaled up by adding a new load balancer, the updated service map will reflect a newly added load balancer.

Figure 7:
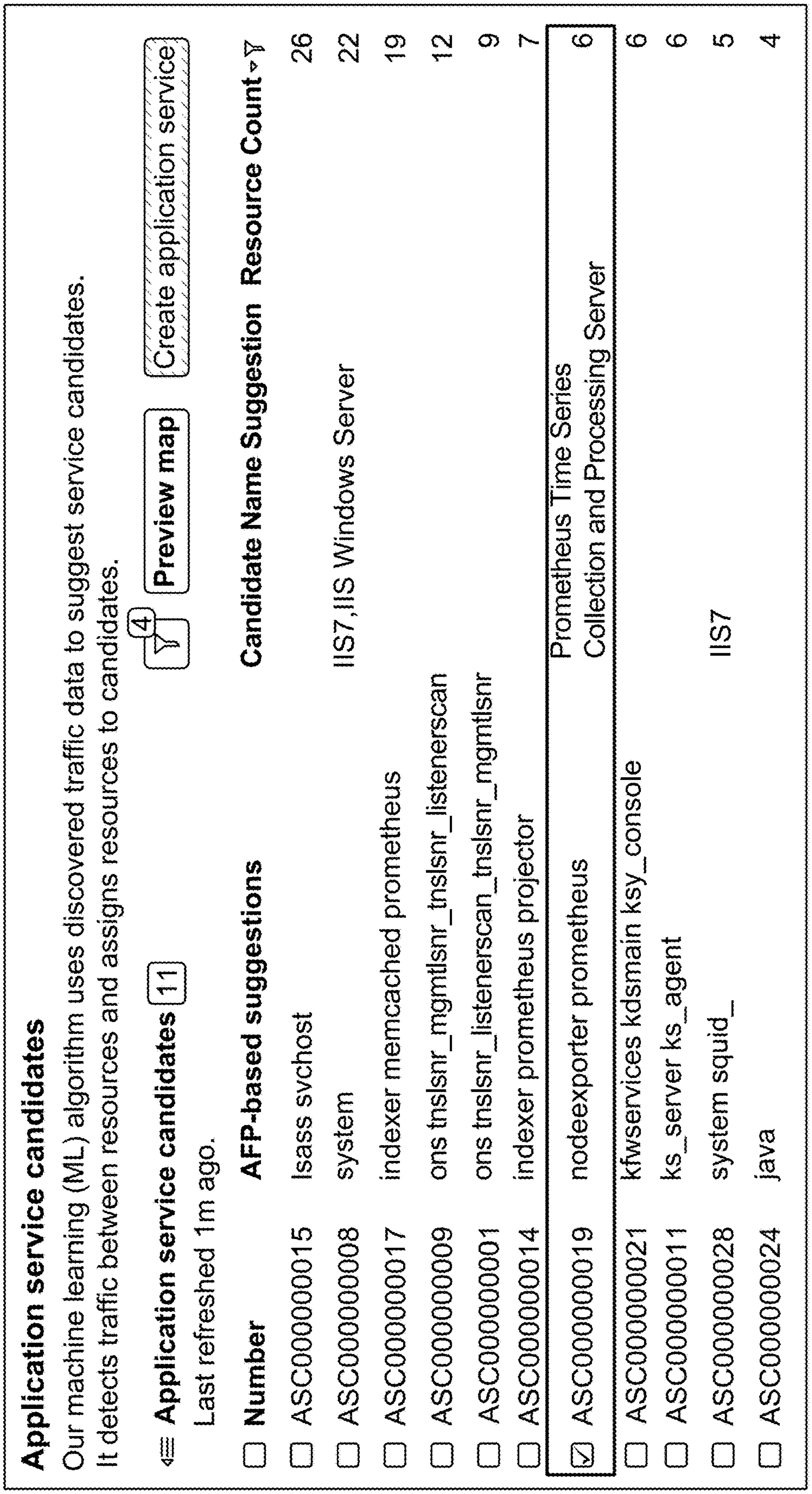
FIG. 7 is a diagram illustrating an embodiment of a user interface for viewing automatically discovered services.

FIG. 7 is a diagram illustrating an embodiment of a user interface for viewing automatically discovered services. In the example shown, user interface 700 is part of a user interface for an automatic service discovery service running on an application server such as application server 101 of FIG. 1. In various embodiments, user interface 700 is accessible using a network client application such as a web browser or another client application by users such as information technology administrators. In some embodiments, user interface 700 displays the results of the automatic service discovery performed using the processes of FIGS. 2-5 on an information technology network environment such as customer network environment 111 of FIG. 1. In some embodiments, the functionality described related to the process of FIG. 6 is accessible from user interface 700.

In the example shown, user interface 700 displays discovered services as application service candidates. Each discovered service is shown with an assigned unique identifier under the column labeled "Number." For example, the discovered service that is highlighted is assigned the numeric identifier "ASC000000019." In addition to the identifier, user interface 700 displays two automatically suggested names for each discovered service and a resource count. The first of the two automatically suggested names is based on an application fingerprint of the service and its components and is shown under the column labeled "AFP-based suggestions." The second of the two automatically suggested names is based on a different naming technique such as one based on the names of the service processes and is shown under the column labeled "Candidate Name Suggestion." The corresponding resource count for each discovered service is shown under the column labeled "Resource Count." In various embodiments, the resource count of a service corresponds to the number of service nodes (or processes) assigned to the service. The discovered service that is highlighted in user interface 700 shows an AFP-based suggested name "nodeexporter prometheus," a candidate name suggestion "Prometheus Time Series Collection and Processing Server," and a resource count of 6. In various embodiments, the discovered services are automatically discovered by applying a machine learning prediction to discovered traffic data to suggest service candidates.

In the example shown, user interface 700 allows the user to select a discovered service (also known as an application service candidate) and apply two actions, a preview map action and a create application service action. The two actions correspond to the two buttons in the upper right corner of user interface 700 labeled "Preview map" and "Create application service," respectively. To the left of the preview map button is a filter button (shown as a funnel icon) that allows the user to apply a filter action to filter the displayed discovered services. In various embodiments, when a discovered service is selected and the preview map button is invoked, the preview map action displays the visual service map of the selected service. In some embodiments, visual map 800 of FIG. 8 is an example visual map for the highlighted service shown in user interface 700 and visual map 800 of FIG. 8 is displayed when the preview map action is invoked.

In some embodiments, when a discovered service is selected and the create application service button is invoked, the create application service action displays a user interface for creating a rule-based service template for the selected service. Using the rule-based template, the selected service can be defined using service rules. Defining the service using a rule-based template allows for future monitoring and management of the service as well as allowing for the dynamic updating of the service and its visual map. For example, as the network environment and service components change, the visual map of the service is dynamically updated by applying the service rules described by the created service template.

Figure 8:
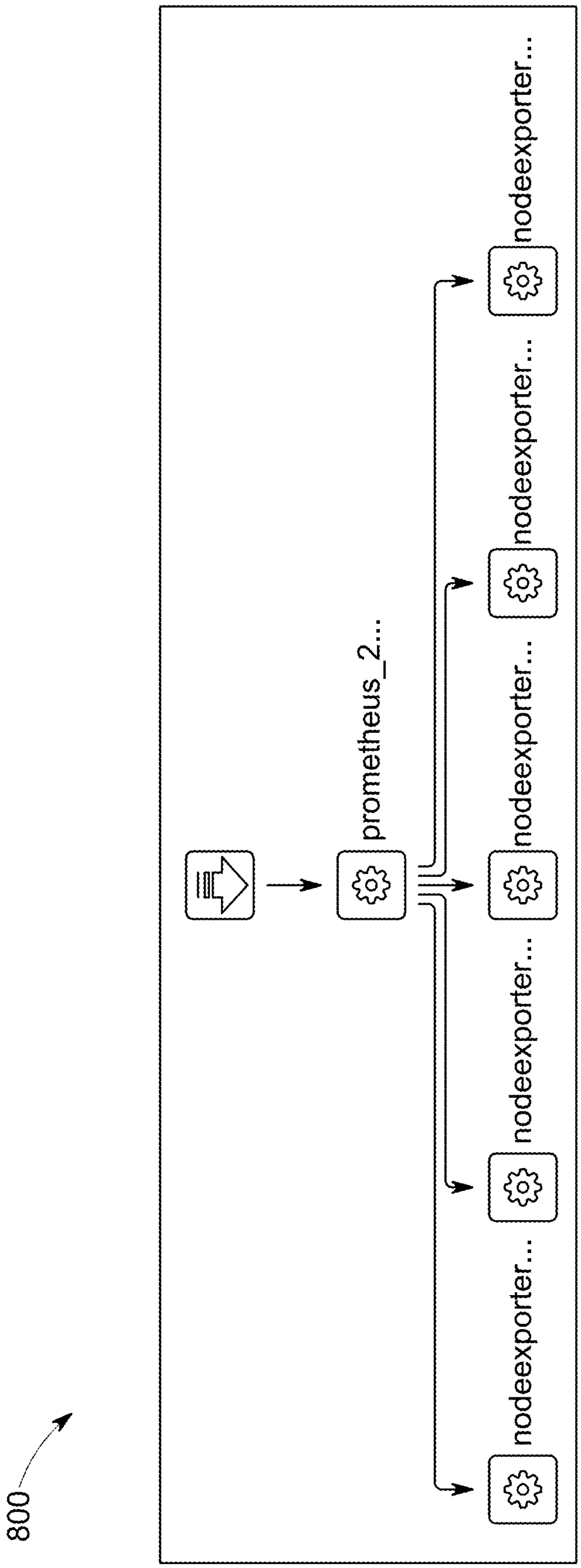
FIG. 8 is a diagram illustrating an embodiment of an automatically generated visual service map for an automatically discovered service.

FIG. 8 is a diagram illustrating an embodiment of an automatically generated visual service map for an automatically discovered service. In the example shown, visual map 800 is displayed within a user interface view for an automatic service discovery service running on an application server such as application server 101 of FIG. 1. In various embodiments, visual map 800 is accessible via a graphical user interface from a network client application such as a web browser or another client application by users such as information technology administrators. In some embodiments, visual map 800 is automatically generated using the processes of FIGS. 2-5 based on applying a discovery service process described herein to an information technology network environment such as customer network environment 111 of FIG. 1.

In the example shown, visual map 800 is automatically generated and corresponds to an automatically discovered service. The service of visual map 800 includes six resources or service nodes. In various embodiments, each service node corresponds to a process and the arrows between the service nodes correspond to connections such as directional network connections. As shown in the example, each service node is labeled. In various embodiments, the labels correspond to and/or are based on the names of the corresponding service process nodes. Also shown in visual map 800 as an arrow is the entry point to the service. In the example shown, visual map 800 corresponds to a metric and alert monitoring service. The initial node pointed to by the entry point is labeled "prometheus_2 . . . " and the remaining nodes are labeled "nodeexporter . . . " In the example shown, the labeled names are truncated because of their length and correspond to prometheus process nodes and node exporter process nodes, respectively. In various embodiments, additional details of each service node and the service connections can be shown, including the full service node name, by selecting the relevant nodes or connections. In the example shown, visual map 800 describes a service that includes an initial prometheus process that is connected but multiple node exporter processes. In some embodiments, the service of visual map 800 corresponds to a metric and alert monitoring service.

In some embodiments, visual map 800 can be modified and edited by a user, for example, to add or remove nodes. Moreover, based on visual map 800, the discovered service can be defined as a rule-based service template that allows a corresponding rule-based generated visual map (not shown) to be dynamically updated. For example, in the event new node exporter processes are provisioned, the new service nodes will be automatically added to the rule-based generated visual map based on a service rule that captures connections and nodes between the prometheus process node and a node exporter process node.

Figure 9:
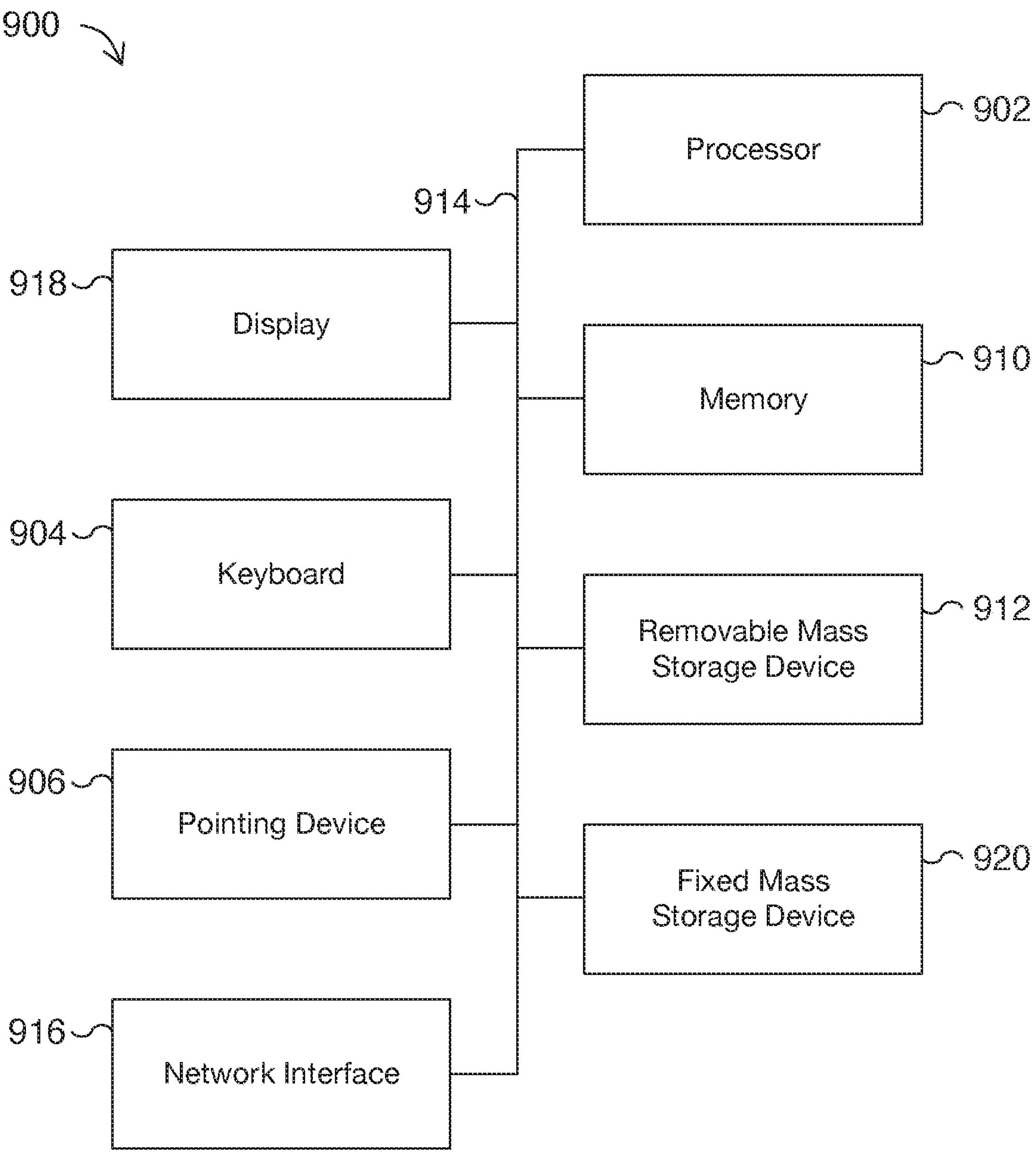
FIG. 9 is a functional diagram illustrating a programmed computer system for performing the automatic discovery of services.

FIG. 9 is a functional diagram illustrating a programmed computer system for performing the automatic discovery of services. As will be apparent, other computer system architectures and configurations can be utilized for order-preserving obfuscation of a protected dataset and/or performing comparison queries on the obfuscated data. Examples of computer system 900 include one or more computers of application server 101 of FIG. 1, one or more computers of database 103 of FIG. 1, internal server 107 of FIG. 1, and devices 113, 115, 117, and 119 of FIG. 1. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In various embodiments, one or more instances of computer system 900 can be used to implement at least portions of the processes of FIGS. 2-6.

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data and objects used by the processor 902 to perform its functions (e.g., programmed instructions). For example, memory 910 can include any suitable computer-readable storage media, described below, depending on whether, for example, data access needs to be bi-directional or unidirectional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or unidirectionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:

tracking data communication between a plurality of computer processes;

classifying, using a machine learning model, the data communication between the plurality of computer processes to identify relationships between the plurality of computer processes, wherein the machine learning model is trained using properties associated with the data communication between the plurality of computer processes;

based at least in part on the relationships between the plurality of computer processes, discovering an existence of a service provided by a functional group of computer processes included in the plurality of computer processes; and generating a visual map of the discovered service, wherein the visual map includes visual representations of:

service resources corresponding to the functional group of computer processes of the discovered service; and service connections utilized to provide the discovered service.

2. The method of claim 1, wherein the visual map is specific to the discovered service and does not include other visual representations of other service resources not utilized to provide the discovered service.

3. The method of claim 1, further comprising predicting a confidence score for at least one discovered connection between at least two of the functional group of computer processes.

4. The method of claim 1, wherein discovering the existence of the service provided by the functional group of computer processes includes identifying an entry point to the discovered service provided by the functional group of computer processes.

5. The method of claim 1, further comprising creating a set of logical rules associated with the discovered service provided by the functional group of computer processes.

6. The method of claim 1, wherein tracking the data communication includes identifying one or more network connections between the plurality of computer processes.

7. The method of claim 1, wherein the generated visual map is an interactive map.

8. The method of claim 1, wherein the properties associated with the data communication include connection properties and process properties.

9. The method of claim 8, wherein the connection properties include a connection direction, a protocol, an address, or a port, and wherein the process properties include access privileges, a user account, a process type, a process name, or a process priority.

10. The method of claim 1, further comprising displaying, via a graphical user interface, the visual map of the discovered service.

11. A system comprising:

one or more processors configured to:

track data communication between a plurality of computer processes;

classify, using a machine learning model, the data communication between the plurality of computer processes to identify relationships between the plurality of computer processes, wherein the machine learning model is trained using properties associated with the data communication between the plurality of computer processes;

based at least in part on the relationships between the plurality of computer processes, discover an existence of a service provided by a functional group of computer processes included in the plurality of computer processes; and generate a visual map of the discovered service, wherein the visual map includes visual representations of:

service resources corresponding to the functional group of computer processes of the discovered service; and service connections utilized to provide the discovered service; and a memory coupled to the one or more processors, wherein the memory is configured to provide the one or more processors with instructions.

12. The system of claim 11, wherein the visual map is specific to the discovered service and does not include other visual representations of other service resources not utilized to provide the discovered service.

13. The system of claim 11, wherein the one or more processors are further configured to predict a confidence score for at least one discovered connection between at least two of the functional group of computer processes.

14. The system of claim 11, wherein discovering the existence of the service provided by the functional group of computer processes includes identifying an entry point to the discovered service provided by the functional group of computer processes.

15. The system of claim 11, wherein the one or more processors are further configured to create a set of logical rules associated with the discovered service provided by the functional group of computer processes.

16. The system of claim 11, wherein the generated visual map is an interactive map.

17. The system of claim 11, wherein the properties associated with the tracked data communication include connection properties and process properties.

18. The system of claim 17, wherein the connection properties include a connection direction, a protocol, an address, or a port, and wherein the process properties include access privileges, a user account, a process type, a process name, or a process priority.

19. The system of claim 11, wherein the one or more processors are further configured to display, via a graphical user interface, the visual map of the discovered service.

20. A computer program product, the computer program product being embodied in a non-transitory computer readable storage medium and comprising computer instructions for:

tracking data communication between a plurality of computer processes;

classifying, using a machine learning model, the data communication between the plurality of computer processes to identify relationships between the plurality of computer processes, wherein the machine learning model is trained using properties associated with the data communication between the plurality of computer processes;

based at least in part on the relationships between the plurality of computer processes, automatically discovering an existence of a service provided by a functional group of computer processes included in the plurality of computer processes; and generating a visual map of the discovered service, wherein the visual map includes visual representations of:

service resources corresponding to the functional group of computer processes of the discovered service; and service connections utilized to provide the discovered service.

* * * * *